US012654993B2

(12) United States Patent
Bertram et al.

(10) Patent No.: US 12,654,993 B2
(45) Date of Patent: Jun. 16, 2026

(54) SAFETY LOCKING DEVICE FOR A SHAFT DOOR OF AN ELEVATOR AND METHOD FOR OPENING A SHAFT DOOR OF AN ELEVATOR USING A SAFETY LOCKING DEVICE

(71) Applicant: Inventio AG, Hergiswil (CH)

(72) Inventors: Andreas Bertram, Lucerne (CH); Roland Delvento, Buren NW (CH); Andreas Egger, Kriens (CH); Flavio Greissinger, Kussnacht (CH); Reto Hugentobler, Ennetburgen (CH); Peter Mori, Rothenburg (CH); Martin Rigert, Kriens (CH); Martin Rogger, Rotkreuz (CH); Ruedi Stocker, Eschenbach LU (CH); Oliver Wuthrich, Eich (CH)

(73) Assignee: INVENTIO AG, Hergiswil (CH)

( * ) Notice: Subject to any disclaimer, the term of this patent is extended or adjusted under 35 U.S.C. 154(b) by 38 days.

(21) Appl. No.: 18/719,286

(22) PCT Filed: Dec. 7, 2022

(86) PCT No.: PCT/EP2022/084710

§ 371 (c)(1),
(2) Date: Jun. 13, 2024

(87) PCT Pub. No.: WO2023/117417

PCT Pub. Date: Jun. 29, 2023

(65) Prior Publication Data

US 2025/0051136 A1 Feb. 13, 2025

(30) Foreign Application Priority Data

Dec. 20, 2021 (EP) .................................... 21215856

(51) Int. Cl.
*B66B 13/16* (2006.01)
*B66B 13/08* (2006.01)

(52) U.S. Cl.
CPC .............. *B66B 13/16* (2013.01); *B66B 13/08* (2013.01)

(58) Field of Classification Search
CPC ................................ B66B 13/16; B66B 13/08
See application file for complete search history.

(56) References Cited

U.S. PATENT DOCUMENTS

| | | | | |
|---|---|---|---|---|
| 10,526,172 | B2 * | 1/2020 | Meguro | B66B 5/005 |
| 2014/0158470 | A1 * | 6/2014 | Arai | B66B 17/34 187/355 |
| 2019/0031468 | A1 | 1/2019 | Meguro et al. | |

FOREIGN PATENT DOCUMENTS

| | | | | |
|---|---|---|---|---|
| WO | WO-2014191380 A1 * | 12/2014 | | B66B 11/0246 |
| WO | 2018079032 A1 | 5/2018 | | |

* cited by examiner

*Primary Examiner* — Diem M Tran
(74) *Attorney, Agent, or Firm* — Shumaker, Loop & Kendrick, LLP

(57) ABSTRACT

A safety locking device for a shaft door of an elevator and a method for opening the shaft door using the safety locking device involve a shaft door lock having: a first stopper stopping the shaft door at a closed first position wherein the lock locks the shaft door; an emergency release mechanism manually releasing the lock allowing movement in an opening direction; a second stopper stopping the shaft door at a semi-open second position between closed and open wherein the lock locks the shaft door; and at least one counter-stopper engaging with the first stopper to stop the shaft door at the first position and engaging with the second stopper to stop the shaft door at the second position.

14 Claims, 6 Drawing Sheets

SAFETY LOCKING DEVICE FOR A SHAFT DOOR OF AN ELEVATOR AND METHOD FOR OPENING A SHAFT DOOR OF AN ELEVATOR USING A SAFETY LOCKING DEVICE

FIELD

Embodiments of the present disclosure relate to a safety locking device for a shaft door of an elevator and a method for opening a shaft door of an elevator using a safety locking device.

BACKGROUND

Automatic doors permit modern barrier-free access, exit, and passage in many buildings. As an example, automatic doors at grocery stores and office buildings are mainly used for convenience and as an aid for handicapped people. On the other hand, automatic doors in an elevator are absolutely essential. For instance, automatic doors for elevators keep people from falling down an open elevator shaft or from having contact with the elevator shaft during transportation between floors of a building.

Elevators use two different sets of doors: car doors on the car and shaft doors opening into the elevator shaft. There are different types of shaft doors, such as sliding doors, swing doors and folding doors. Sliding doors can be single sliding doors, telescopic sliding doors, and centrally opening sliding doors, for example. The advantage of sliding doors in general is that sliding doors disappear in the shaft and are hidden behind a facing wall or a portal. In the case of telescopic sliding doors, the individual door elements, also called door leaves or panels, slide one behind the other to the right or left. Depending on the width of the complete elevator, the door leaves can be as a two- or three-panel door. Widely spread and most often used are two-leaf doors.

Usually, the shaft doors of the elevator are tightly locked with a shaft door lock, e.g., located at the corresponding stationary door frame, when the shaft door is at a closed configuration. The shaft door lock can, under normal circumstances, only be opened by an automatic system when an elevator car, particularly the doors on the car, is positioned at the shaft door.

In order to gain access to the elevator shaft in the case of breakdowns and see where the elevator car is located or in other emergency cases, it must be possible for an authorized person to manually release the shaft door lock and consequently open a shaft door in a closed configuration from a floor, for which purpose an emergency release mechanism is provided. The emergency release mechanism is accessed by an authorized person using emergency release key, and opens the shaft door lock manually.

However, opening the shaft doors using the emergency release mechanism implies a risk for the authorized person operating the emergency release mechanism. For instance, once the shaft door lock is released using the emergency release mechanism and the shaft doors are opened, a person can fall down in the elevator shaft or suffer injuries while standing close to the shaft doors, especially if the person is distracted.

Therefore, there exists a need for an emergency release mechanism for a shaft door that allows opening the shaft door in emergency cases while further improving safety.

SUMMARY

In light of the above, a safety locking device for a shaft door of an elevator and a method for opening a shaft door of an elevator using a safety locking device are provided. Further aspects, benefits, and features of the present disclosure are apparent from the claims, the description, and the accompanying drawings.

According to an aspect of the present disclosure a safety locking device for a shaft door of an elevator is provided. The shaft locking device comprises a shaft door lock having a first stopper for stopping the shaft door at a first position corresponding to a closed configuration of the shaft door, the shaft door lock having a first locked configuration for locking the shaft door at the first position. Further, the shaft locking device includes an emergency release mechanism for manually releasing the shaft door lock from the first locked configuration, thereby allowing the shaft door to move, from the first position, in an opening direction for opening the shaft door. Furthermore, the shaft door lock has a second stopper for stopping the shaft door at a second position corresponding to a semi-open configuration of the shaft door being between the closed configuration and an open configuration of the shaft door, the shaft door lock having a second locked configuration for locking the shaft door at the second position. Moreover, the shaft door lock comprises at least one counter-stopper configured to engage with the first stopper for stopping the shaft door at the first position and with the second stopper for stopping the shaft door at the second position.

According to another aspect of the present disclosure, a method for opening a shaft door of an elevator using a safety locking device is provided. The method includes: stopping the shaft door at a first position corresponding to a closed configuration of the shaft door with a shaft door lock having a first stopper and at least one counter-stopper configured to engage with the first stopper, manually releasing the shaft door lock in the closed configuration of the shaft door using an emergency release mechanism, allowing the shaft door to move, from the first position, in an opening direction for opening the shaft door, and stopping the shaft door at a second position corresponding to a semi-open configuration of the shaft door with the shaft door lock having further a second stopper and the at least one counter-stopper further configured to engage with the second stopper.

DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION

Figure 1A:
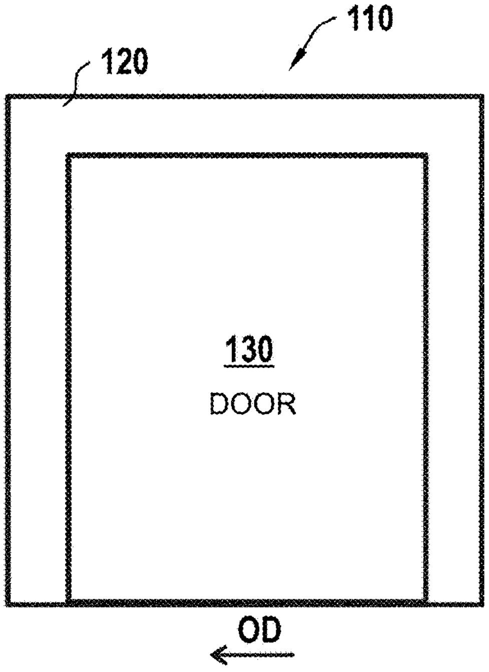
FIGS. 1A and 1B show schematic views of a shaft door of an elevator according to embodiments described herein.

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

In order to gain access to the elevator shaft in the case of breakdowns or in other emergency cases, an authorized person has to be able to manually release the shaft door lock and consequently open a shaft door in a closed configuration from a floor by using an emergency release mechanism, for instance. Once the shaft doors are opened, there exists a risk for the authorized person, or for another person, of falling down in the elevator shaft or suffer injuries. The present disclosure provides a safety locking device for a shaft door of an elevator and a method for opening a shaft door of an elevator using a safety locking device allowing to open the shaft doors of an elevator in a safe manner. This is achieved by the shaft door lock having a second stopper for stopping the shaft door at a second position corresponding to a semi-open configuration of the shaft door and locking the shaft door at the second position (in a second locked configuration). The semi-open configuration of the shaft door is between the closed configuration and an open configuration of the shaft door (e.g., with an opening width of at least 10 cm and/or at most 50 cm). Thereby, the shaft door allows physical access to the car or shaft, while avoiding being accidentally mistaken for a regularly open shaft door and/or possibly even physically blocking a person from accidentally entering the shaft. Thereby, safety is improved.

Before various embodiments of the present disclosure are described in more detail, some aspects with respect to some terms and expressions used herein are explained.

In the present disclosure, the term “shaft door” may be understood as a single or a plurality of panels, e.g. supported via rollers on one or more overhead tracks, which are used to close and open an entrance of a vertical passageway through a building, e.g., as for an elevator. The term “shaft door” may be also understood as a door that can be opened and closed so that a user can get in and out of a vertical passageway through a building, e.g., as for an elevator. Further, the term “stationary door frame” may be understood as a stationary structure that gives shape and support to a shaft door. Furthermore, the term “stationary door frame” may be understood as a stationary border that surrounds and supports a shaft door and defines a shaft door opening that can be closed by the shaft door.

While a preferred type of shaft door is a sliding door with one or more panels, the present invention is not limited to any particular type of shaft door and may also be applied to other shaft door types.

The term “full opening width” is to be understood as the horizontal width of the open space defined by the shaft door in the full open position. For example, in the case of a centrally opening sliding door, the full opening width may be the distance measured horizontally between the inner vertical edges of the left and right (inner) door panels of the shaft door when the shaft door is in the full open position.

Likewise, the term “semi-opening width” is to be understood as the horizontal width of the open space defined by the shaft door in the semi-open position. For example, in the case of a centrally opening sliding door, the semi-opening width may be the distance measured horizontally between the inner vertical edges of the left and right (inner) door panels of the shaft door when the shaft door is in the semi-open position.

The terms “closed configuration”, “semi-open configuration”, and “open configuration” relate to a degree of the shaft door being opened. For instance, the term “closed configuration” refers to a shaft door being completely closed, thereby impeding a user to go through the shaft door. Further, the term “semi-open configuration” refers to a shaft door being partially open (with the semi-opening width being smaller than the full opening width). Thereby, a person may be allowed to access the space behind the shaft door through the shaft door at least partially, e.g., by an arm. Possibly, the semi-open configuration may hinder an average adult from passing through the shaft door with the entire body, or at least make such a passing difficult or avoid confusion with a regularly open shaft door.

Moreover, the term “open configuration” refers to a shaft door being opened further than the semi-open configuration, thereby allowing a person to pass through the shaft door. In addition, the term “fully opening configuration” refers to a shaft door opened maximally.

The term “opening direction” relates to a direction of motion for moving the shaft door from a closed configuration towards a semi-open configuration or an open configuration. The opening direction may be defined for each shaft door panel individually. Herein, the opening direction refers to the direction of the moving shaft door element (e.g., shaft door panel) to which the emergency locking mechanism is coupled.

The terms “stopper” and “counter-stopper” may be understood as an object that stops the movement of a door. The term “co-moveable” is to be understood as at least two objects, e.g., a (first and/or second) stopper and a shaft door, being able to move together from a first position to a second position.

The term “lock” is to be understood as fixing at a position or as refraining from opening beyond a position. For instance, the term “locking the shaft door at a first position” is to be understood as fixing the shaft door at a first position, or at least as restraining the shaft door from opening beyond the first position. The terms “first locked configuration” and “second locked configuration” refer to a shaft door locked at a first position and at a second position, respectively. The term “stopping the shaft door” is to be understood as ending the movement of the shaft door.

The term “extended stopper position” is to be understood as a position of a stopper, wherein the stopper can contact a counter-stopper. The term “extended counter-stopper position” is to be understood as a position of a counter-stopper, wherein the counter-stopper can contact a stopper. The term “retracted (counter-)stopper position” is to be understood as a position of a (counter-)stopper, where the (counter-stopper) is moved to avoid contact with a counter-stopper (stopper). This may be achieved by the (counter-)stopper moved back into a shaft door or a stationary door frame, but may also relate to any other movement in which the (counter-)stopper is moved out of the way in order to avoid contact or engagement with the counter-stopper (stopper).

Figure 1B:
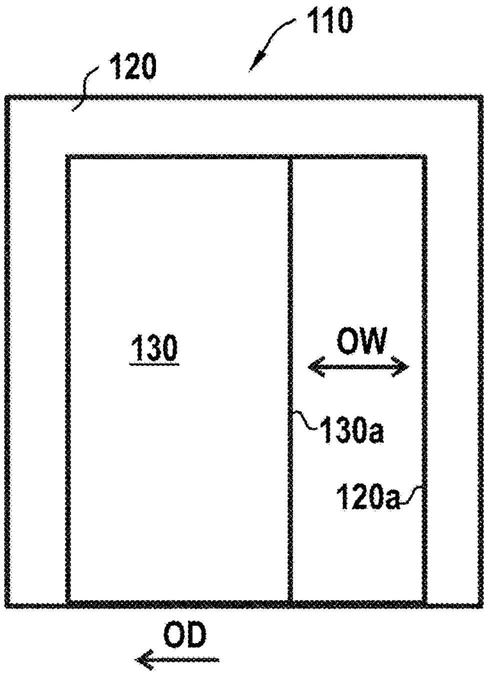

FIGS. 1A and 1B show schematic views of a shaft door of an elevator according to embodiments described herein.

The elevator 110 may include a frame 120 and a shaft door 130. As exemplary shown in FIGS. 1A and 1B, the shaft door 130 may include a single panel. Referring to FIG. 1A, the shaft door 130 may be in a first position corresponding to a closed configuration of the shaft door 130. The shaft door 130 may be open in an opening direction OD. Referring to FIG. 1B, the shaft door 130 may be in a second position corresponding to a semi-open configuration of the shaft door 130.

According to some embodiments, which can be combined with other embodiments described herein, a semi-open configuration of the shaft door, e.g., the shaft door 130, may be between a closed configuration and an open configuration of the shaft door, e.g., the shaft door 130. In some embodiments, a first position of a shaft door, e.g., the shaft door 130, may correspond to a closed configuration of the shaft door, e.g., the shaft door 130. In some embodiments, a second position of a shaft door, e.g., the shaft door 130, may correspond to a semi-open configuration of the shaft door, e.g., the shaft door 130.

According to some embodiments, which can be combined with other embodiments described herein, a semi-open opening width OW of a shaft door, e.g., the shaft door 130, may be at most half of the full opening width of the shaft door, e.g., the shaft door 130, in a fully open configuration. In some embodiments, a semi-open opening width OW of a shaft door, e.g., the shaft door 130, may be at most 40 cm, preferably at most 30 cm, and more preferably at least 10 cm of the open configuration of the shaft door, e.g., the shaft door 130. As exemplary shown in FIG. 1B, a semi-open opening width OW may be a distance measured horizontally between a vertical edge, e.g., a vertical edge 130*a*, of a panel of a shaft door, e.g., the shaft door 130, limiting an opening of the shaft door, e.g., the shaft door 130, and a vertical edge, e.g., a vertical edge 120*a*, of a stationary door frame, e.g., a stationary door frame 120, limiting the opening of the shaft door, e.g., the shaft door 130.

Figure 2A:
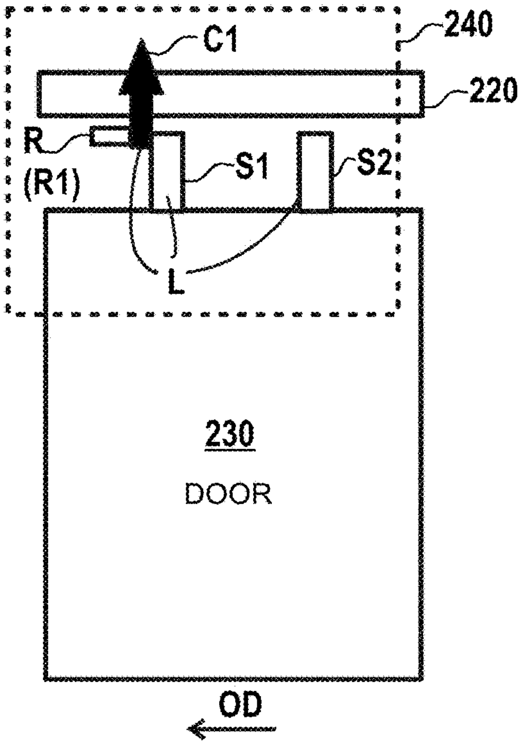
FIGS. 2A to 7B show schematic views of a safety locking device for a shaft door of an elevator according to embodiments described herein.
Figure 2B:
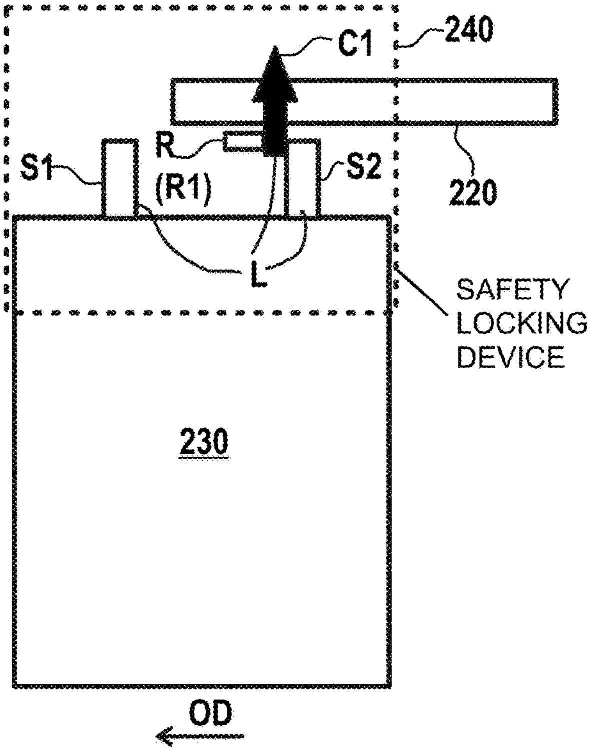

FIGS. 2A und and 2B show schematic views of a safety locking device 240 for a shaft door 230 of an elevator according to embodiments described herein. In particular, FIG. 2A shows a schematic view of a safety locking device 240 for a shaft door 230 of an elevator at a first position. Further, FIG. 2B shows a schematic view of a safety locking device 240 for a shaft door 230 of an elevator at a second position. The first position of the shaft door 230 corresponds to a closed configuration of the shaft door 230. Furthermore, the second position of a shaft door 230 corresponds to a semi-open configuration of the shaft door 230.

The safety locking device 240 includes a shaft door lock L. Further, the shaft door lock L has a first stopper S1. The first stopper S1 is for stopping the shaft door 230 at a first position corresponding to a closed configuration of the shaft door 230. Furthermore, the shaft door lock L has a first locked configuration. The first locked configuration of the shaft door lock L is for locking the shaft door 230 at the first position. Moreover, the safety locking device 240 includes an emergency release mechanism R. The emergency release mechanism R is for manually releasing the shaft door lock L from the first locked configuration, thereby allowing the shaft door 230 to move, from the first position, in an opening direction OD for opening the shaft door 230.

Further, the shaft door lock L further has a second stopper S2. The second stopper S2 is for stopping the shaft door 230 at a second position corresponding to a semi-open configuration of the shaft door 230. The semi-open configuration of the shaft door 230 is between the closed configuration and an open configuration of the shaft door 230. Furthermore, the shaft door lock L has a second locked configuration for locking the shaft door 230 at the second position.

Moreover, the shaft door lock L further comprises at least one counter-stopper, e.g., a counter-stopper C1. The at least one counter-stopper, e.g., the counter-stopper C1, is configured to engage with the first stopper S1, e.g., for stopping the shaft door 230 at the first position. Further, at least one counter-stopper, e.g., a counter-stopper C1, is configured to engage with the second stopper S2, e.g., for stopping the shaft door 230 at the second position. As exemplary shown in FIGS. 2A and 2B, at least one counter-stopper, e.g., a counter-stopper C1, may be a single counter-stopper configured to engage with both the first stopper S1 and the second stopper S2.

Accordingly, by stopping the shaft door 230 at the second position corresponding to a semi-open configuration, a user such as an authorized person is able to go partially through the shaft door 230 without falling down in the elevator shaft or suffer injuries due to an elevator car passing close to the shaft door 230. Therefore, stopping the shaft door 230 at the second position corresponding to a semi-open configuration provides a safety manner to open the shaft doors of an elevator in emergency cases.

According to some embodiments, which can be combined with other embodiments described herein, a first stopper, e.g., a first stopper S1, and a second stopper, e.g., a second stopper S2, may be attached to a shaft door, e.g., a shaft door 230. In some embodiments, at least one counter-stopper, e.g., a counter-stopper C1, may be attached to a stationary door frame, e.g., a stationary door frame 220. For the sake of simplicity, only a section of the stationary door frame is shown in FIGS. 2A and 2B and the following corresponding embodiments. In some embodiments, a first stopper, e.g., a first stopper S1, and a second stopper, e.g., a second stopper S2, may be co-moveable together with a shaft door, e.g., a shaft door 230.

According to some embodiments, which can be combined with other embodiments described herein, an emergency release mechanism R may be configured for manually releasing a shaft door lock L from a second locked configuration, thereby allowing a shaft door, e.g., the shaft door 230, to move, from the second position, in an opening direction OD for opening the shaft door, e.g., the shaft door 230. As an example, the shaft door, e.g., the shaft door 230, may be allowed to move in an opening direction OD from the second position to a full open configuration.

According to some embodiments, which can be combined with other embodiments described herein, an emergency release mechanism R may be configured for retracting at least one counter-stopper, e.g., the counter-stopper C1, from an extended counter-stopper position to a retracted counter-stopper position thereby releasing the at least one counter-stopper, e.g., the counter-stopper C1, from an engagement with a respective one of the first stopper S1 or the second stopper S2. In some embodiments, an emergency release mechanism R may include a first release element R1 for retracting the first stopper S1 from an extended stopper position to a retracted stopper position thereby releasing the first stopper S1 from an engagement with a respective one of the at least one counter-stopper, e.g., the counter-stopper C1. In some embodiments, any of the first stopper S1 and the second stopper S2 may include a clamp, clutch, or the like.

In some embodiments, an emergency release mechanism R may be configured for releasing at least one counter-stopper, e.g., the counter-stopper C1, from an engagement with a respective one of the first stopper S1 or the second stopper S2. In some embodiments, an emergency release mechanism R may be configured for locking a shaft door, e.g., the shaft door 230, at a first position. In some embodiments, an emergency release mechanism R may be configured for locking a shaft door, e.g., the shaft door 230, at a second position. In some embodiments, an emergency release mechanism R may be configured for unlocking a shaft door, e.g., the shaft door 230, at a first position. In some embodiments, an emergency release mechanism R may be configured for unlocking a shaft door, e.g., the shaft door 230, at a second position.

In some embodiments, an emergency release mechanism R may include a latch mechanically connected with at least one of a first stopper S1 and a second stopper S2. In some embodiments, an emergency release mechanism R may include a latch mechanically connected with at least one counter-stopper, e.g., the counter-stopper C1. Further, an emergency release mechanism may include an opening adapted to be passed by a key.

Figure 3A:
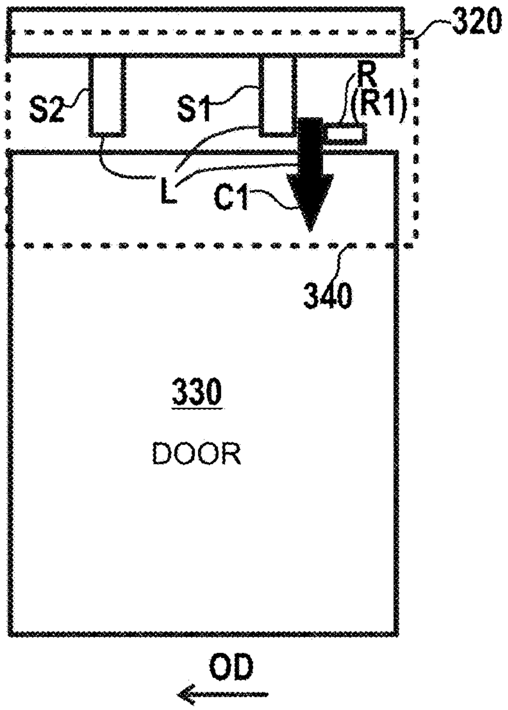
Figure 3B:
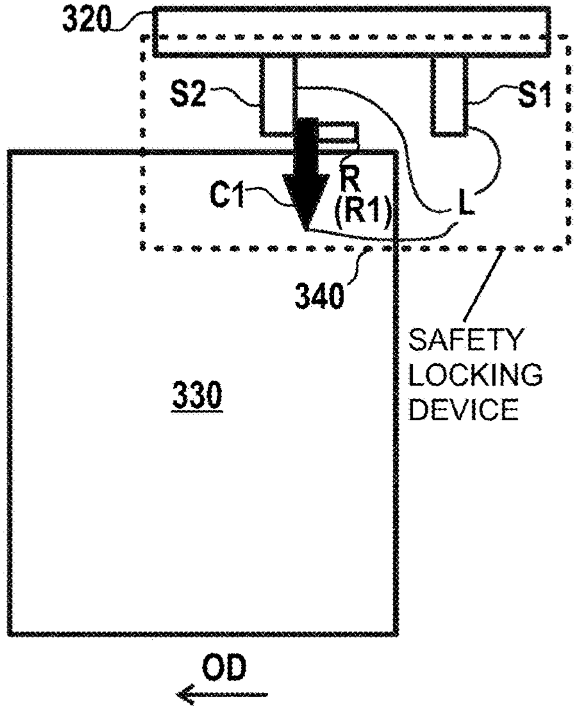

FIGS. 3A und and 3B show schematic views of a safety locking device 340 for a shaft door 330 of an elevator according to further embodiments described herein. In particular, FIG. 3A shows a schematic view of a safety locking device 340 for a shaft door 330 of an elevator at a first position. Further, FIG. 3B shows a schematic view of a safety locking device 340 for a shaft door 330 of an elevator at a second position. The first position of the shaft door 330 corresponds to a closed configuration of the shaft door 330. Furthermore, the second position of a shaft door 330 corresponds to a semi-open configuration of the shaft door 330.

The safety locking device 340 includes a shaft door lock L. Further, the shaft door lock L has a first stopper S1. The first stopper S1 is for stopping the shaft door 330 at a first position corresponding to a closed configuration of the shaft door 330. Furthermore, the shaft door lock L has a first locked configuration. The first locked configuration of the shaft door lock L is for locking the shaft door 330 at the first position. Moreover, the safety locking device 340 includes an emergency release mechanism R. The emergency release mechanism R is for manually releasing the shaft door lock L from the first locked configuration, thereby allowing the shaft door 330 to move, from the first position, in an opening direction OD for opening the shaft door 330.

Further, the shaft door lock L further has a second stopper S2. The second stopper S2 is for stopping the shaft door 330 at a second position corresponding to a semi-open configuration of the shaft door 330. The semi-open configuration of the shaft door 330 is between the closed configuration and an open configuration of the shaft door 330. Furthermore, the shaft door lock L has a second locked configuration for locking the shaft door 330 at the second position.

Moreover, the shaft door lock L further comprises a counter-stopper C1. The counter-stopper C1 is configured to engage with the first stopper S1 for stopping the shaft door 330 at the first position. Further, the counter-stopper C1 is further configured to engage with the second stopper S2 for stopping the shaft door 330 at the second position. As exemplary shown in FIGS. 3A and 3B, the counter-stopper C1 may be a single counter-stopper configured to engage with both the first stopper S1 and the second stopper S2.

According to some embodiments, which can be combined with other embodiments described herein, the at least one counter-stopper, e.g., the counter-stopper C1, may be attached to a shaft door, e.g., a shaft door 330. In some embodiments, a first stopper, e.g., the first stopper S1, and a second stopper, e.g., the second stopper S2, may be attached to a stationary door frame, e.g., a stationary door frame 320. In some embodiments, the at least one counter-stopper, e.g., the counter-stopper C1, may be co-moveable together with a shaft door, e.g., a shaft door 330.

According to some embodiments, which can be combined with other embodiments described herein, the emergency release mechanism R may be configured for manually releasing the shaft door lock L from a second locked configuration, thereby allowing the shaft door 330, to move, from the second position, in an opening direction OD for opening the shaft door 330.

According to some embodiments, which can be combined with other embodiments described herein, the emergency release mechanism R may be configured for retracting the counter-stopper C1 from an extended counter-stopper position to a retracted counter-stopper position thereby releasing the counter-stopper C1 from an engagement with a respective one of the first stopper S1 or the second stopper S2.

In some embodiments, the emergency release mechanism R may be configured for releasing the counter-stopper C1 from an engagement with a respective one of the first stopper S1 or the second stopper S2. In some embodiments, the emergency release mechanism R may be configured for locking a shaft door 330 at a first position. In some embodiments, the emergency release mechanism R may be configured for locking the shaft door 330 at a second position. In some embodiments, the emergency release mechanism R may be configured for unlocking the shaft door 330 at a first position. In some embodiments, the emergency release mechanism R may be configured for unlocking the shaft door 330 at a second position.

According to some embodiments, which can be combined with other embodiments described herein, the emergency release mechanism R may include a first release element R1 for retracting a counter-stopper C1 from an extended stopper position to a retracted stopper position thereby releasing the first stopper S1 from an engagement with the counter-stopper C1. In some embodiments, the emergency release mechanism R may include a latch mechanically connected with the counter-stopper C1. Further, the emergency release mechanism may include an opening adapted to be passed by a key.

Figure 4A:
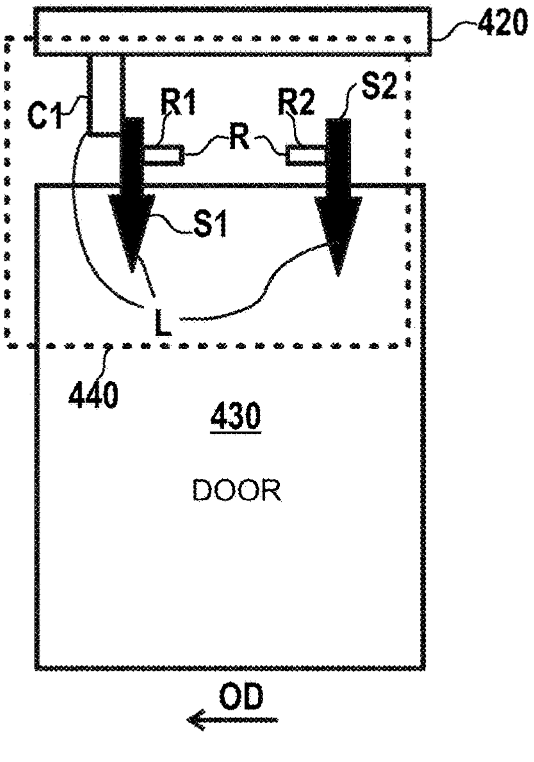
Figure 4B:
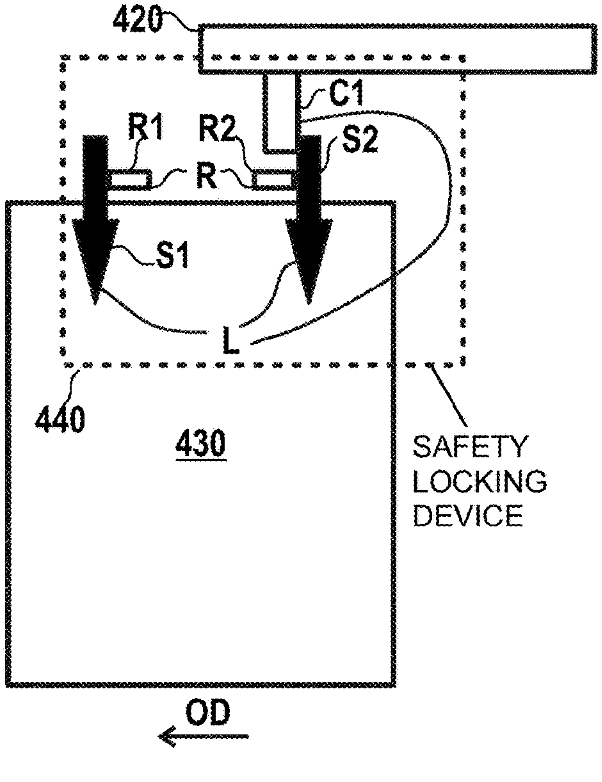

FIGS. 4A und and 4B show schematic views of a safety locking device 440 for a shaft door 430 of an elevator according to further embodiments described herein. In particular, FIG. 4A shows a schematic view of a safety locking device 440 for a shaft door 430 of an elevator at a first position. Further, FIG. 4B shows a schematic view of a safety locking device 440 for a shaft door 430 of an elevator at a second position. The first position of the shaft door 430 corresponds to a closed configuration of the shaft door 430. Furthermore, the second position of a shaft door 430 corresponds to a semi-open configuration of the shaft door 430.

The safety locking device 440 includes a shaft door lock L. Further, the shaft door lock L has a first stopper S1. The first stopper S1 is for stopping the shaft door 430 at a first position corresponding to a closed configuration of the shaft door 430. Furthermore, the shaft door lock L has a first locked configuration. The first locked configuration of the shaft door lock L is for locking the shaft door 430 at the first position. Moreover, the safety locking device 440 includes an emergency release mechanism R. The emergency release mechanism R is for manually releasing the shaft door lock L from the first locked configuration, thereby allowing the shaft door 430 to move, from the first position, in an opening direction OD for opening the shaft door 430.

Further, the shaft door lock L further has a second stopper S2. The second stopper S2 is for stopping the shaft door 430 at a second position corresponding to a semi-open configuration of the shaft door 430. The semi-open configuration of the shaft door 430 is between the closed configuration and an open configuration of the shaft door 430. Furthermore, the shaft door lock L has a second locked configuration for locking the shaft door 430 at the second position.

Moreover, the shaft door lock L further comprises a counter-stopper C1. The counter-stopper C1 is configured to engage with the first stopper S1 for stopping the shaft door 430 at the first position. Further, the counter-stopper C1 is further configured to engage with the second stopper S2 for stopping the shaft door 430 at the second position. As exemplary shown in FIGS. 4A and 4B, the counter-stopper C1 may be a single counter-stopper configured to engage with both the first stopper S1 and the second stopper S2.

According to some embodiments, which can be combined with other embodiments described herein, the first stopper S1 and the second stopper S2 may be attached to the shaft door 430. In some embodiments, the counter-stopper C1 may be attached to a stationary door frame, e.g., a stationary door frame 420. In some embodiments, the first stopper S1 and the second stopper S2 may be co-moveable together with the shaft door 430.

According to some embodiments, which can be combined with other embodiments described herein, the emergency release mechanism R may be configured for manually releasing the shaft door lock L from a second locked configuration, thereby allowing the shaft door 430, to move, from the second position, in an opening direction OD for opening the shaft door 430.

According to some embodiments, which can be combined with other embodiments described herein, the emergency release mechanism R may be configured for retracting the first stopper S1 and the second stopper S2 from an extended stopper position to a retracted stopper position thereby releasing the counter-stopper C1 from an engagement with a respective one of the first stopper S1 or the second stopper S2.

In some embodiments, the emergency release mechanism R may be configured for releasing the counter-stopper C1 from an engagement with a respective one of the first stopper S1 or the second stopper S2. In some embodiments, the emergency release mechanism R may be configured for locking a shaft door 430 at a first position. In some embodiments, the emergency release mechanism R may be configured for locking the shaft door 430 at a second position. In some embodiments, the emergency release mechanism R may be configured for unlocking the shaft door 430 at a first position. In some embodiments, the emergency release mechanism R may be configured for unlocking the shaft door 430 at a second position.

According to some embodiments, which can be combined with other embodiments described herein, the emergency release mechanism R may include a first release element R1 for retracting a first stopper S1 from an extended stopper position to a retracted stopper position thereby releasing the first stopper S1 from an engagement with the counter-stopper C1. In some embodiments, the emergency release mechanism R may include a second release element R2 for retracting a second stopper S2 from an extended stopper position to a retracted stopper position thereby releasing the first stopper S2 from an engagement with the at least one counter-stopper, e.g., the counter-stopper C1. In some embodiments, the emergency release mechanism R may include a latch mechanically connected with at least one of a first stopper S1 and a second stopper S2. In some embodiments, the emergency release mechanism R may include a latch mechanically connected with a first stopper S1 and a latch mechanically connected with a second stopper S2. Further, the emergency release mechanism may include an opening adapted to be passed by a key.

Figure 5A:
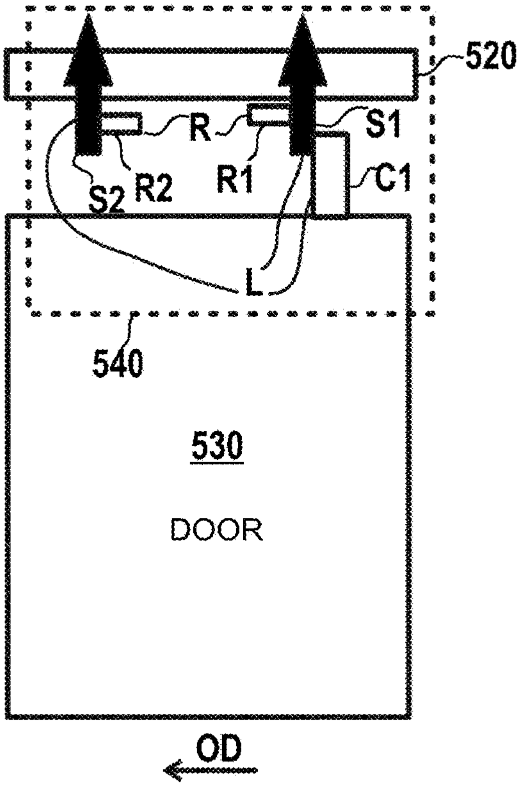
Figure 5B:
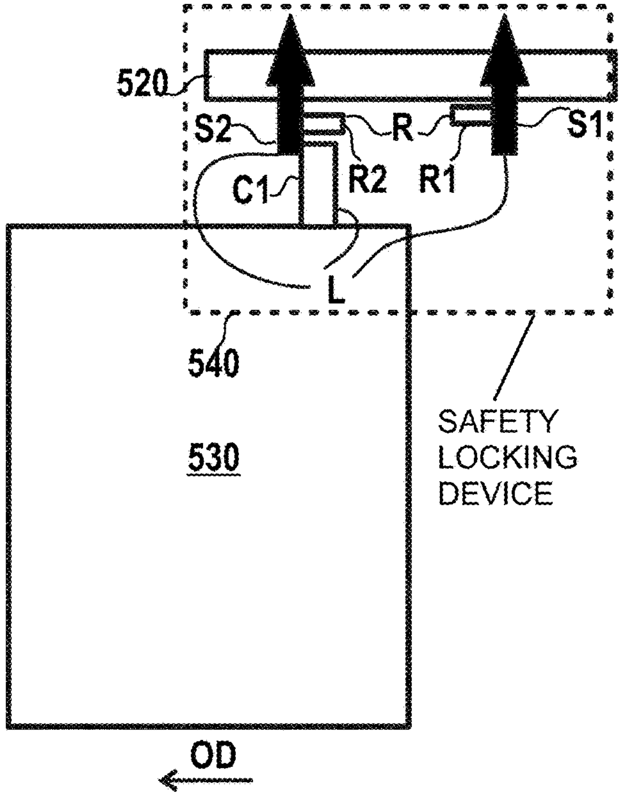

FIGS. 5A und and 5B show schematic views of a safety locking device 540 for a shaft door 530 of an elevator according to further embodiments described herein. In particular, FIG. 5A shows a schematic view of a safety locking device 540 for a shaft door 530 of an elevator at a first position. Further, FIG. 5B shows a schematic view of a safety locking device 540 for a shaft door 530 of an elevator at a second position. The first position of the shaft door 530 corresponds to a closed configuration of the shaft door 530. Furthermore, the second position of a shaft door 530 corresponds to a semi-open configuration of the shaft door 530.

The safety locking device 540 includes a shaft door lock L. Further, the shaft door lock L has a first stopper S1. The first stopper S1 is for stopping the shaft door 530 at a first position corresponding to a closed configuration of the shaft door 530. Furthermore, the shaft door lock L has a first locked configuration. The first locked configuration of the shaft door lock L is for locking the shaft door 530 at the first position. Moreover, the safety locking device 540 includes an emergency release mechanism R. The emergency release mechanism R is for manually releasing the shaft door lock L from the first locked configuration, thereby allowing the shaft door 530 to move, from the first position, in an opening direction OD for opening the shaft door 530.

Further, the shaft door lock L further has a second stopper S2. The second stopper S2 is for stopping the shaft door 530 at a second position corresponding to a semi-open configuration of the shaft door 530. The semi-open configuration of the shaft door 530 is between the closed configuration and an open configuration of the shaft door 530. Furthermore, the shaft door lock L has a second locked configuration for locking the shaft door 530 at the second position.

Moreover, the shaft door lock L further comprises a counter-stopper C1. The counter-stopper C1 is configured to engage with the first stopper S1 for stopping the shaft door 530 at the first position. Further, the counter-stopper C1 is further configured to engage with the second stopper S2 for stopping the shaft door 530 at the second position. As exemplary shown in FIGS. 5A and 5B, the counter-stopper C1 may be a single counter-stopper configured to engage with both the first stopper S1 and the second stopper S2.

According to some embodiments, which can be combined with other embodiments described herein, the first stopper S1 and the second stopper S2 may be attached to a stationary door frame, e.g., a stationary door frame 520. In some embodiments, the counter-stopper C1 may be attached to the shaft door 530. In some embodiments, the counter-stopper C1 may be co-moveable together with the shaft door 530.

According to some embodiments, which can be combined with other embodiments described herein, the emergency release mechanism R may be configured for manually releasing the shaft door lock L from a second locked configuration, thereby allowing the shaft door 530, to move, from the second position, in an opening direction OD for opening the shaft door 530.

According to some embodiments, which can be combined with other embodiments described herein, the emergency release mechanism R may be configured for retracting the first stopper S1 and the second stopper S2 from an extended stopper position to a retracted stopper position thereby releasing the counter-stopper C1 from an engagement with a respective one of the first stopper S1 or the second stopper S2.

In some embodiments, the emergency release mechanism R may be configured for releasing the counter-stopper C1 from an engagement with a respective one of the first stopper S1 or the second stopper S2. In some embodiments, the emergency release mechanism R may be configured for locking a shaft door 530 at a first position. In some embodiments, the emergency release mechanism R may be configured for locking the shaft door 530 at a second position. In some embodiments, the emergency release mechanism R may be configured for unlocking the shaft door 530 at a first position. In some embodiments, the emergency release mechanism R may be configured for unlocking the shaft door 530 at a second position.

According to some embodiments, which can be combined with other embodiments described herein, the emergency release mechanism R may include a first release element R1 for retracting a first stopper S1 from an extended stopper position to a retracted stopper position thereby releasing the first stopper S1 from an engagement with the counter-stopper C1.

In some embodiments, the emergency release mechanism R may include a second release element R2 for retracting a second stopper S2 from an extended stopper position to a retracted stopper position thereby releasing the second stopper S2 from an engagement with the at least one counter-stopper, e.g., the counter-stopper C1. In some embodiments, the emergency release mechanism R may include a latch mechanically connected with at least one of a first stopper S1 and a second stopper S2. In some embodiments, the emergency release mechanism R may include a latch mechanically connected with a first stopper S1 and a latch mechanically connected with a second stopper S2. Further, the emergency release mechanism may include an opening adapted to be passed by a key.

Figure 6A:
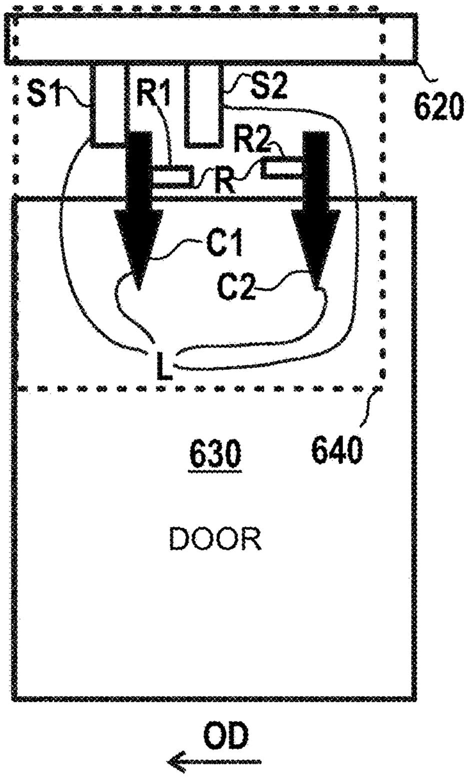
Figure 6B:
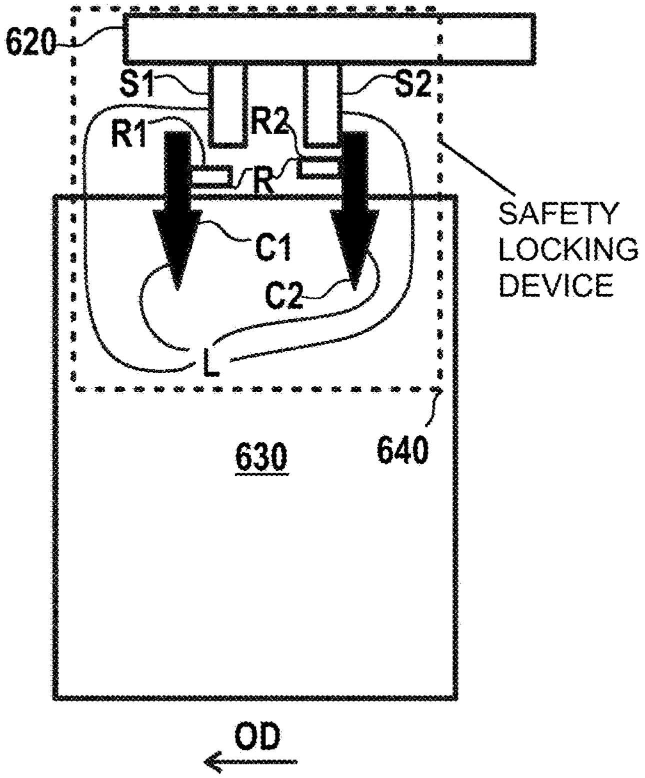

FIGS. 6A und and 6B show schematic views of a safety locking device 640 for a shaft door 630 of an elevator according to further embodiments described herein. In particular, FIG. 6A shows a schematic view of a safety locking device 640 for a shaft door 630 of an elevator at a first position. Further, FIG. 6B shows a schematic view of a safety locking device 640 for a shaft door 630 of an elevator at a second position. The first position of the shaft door 630 corresponds to a closed configuration of the shaft door 630. Furthermore, the second position of a shaft door 630 corresponds to a semi-open configuration of the shaft door 630.

The safety locking device 640 includes a shaft door lock L. Further, the shaft door lock L has a first stopper S1. The first stopper S1 is for stopping the shaft door 630 at a first position corresponding to a closed configuration of the shaft door 630. Furthermore, the shaft door lock L has a first locked configuration. The first locked configuration of the shaft door lock L is for locking the shaft door 630 at the first position. Moreover, the safety locking device 640 includes an emergency release mechanism R. The emergency release mechanism R is for manually releasing the shaft door lock L from the first locked configuration, thereby allowing the shaft door 630 to move, from the first position, in an opening direction OD for opening the shaft door 630.

Further, the shaft door lock L further has a second stopper S2. The second stopper S2 is for stopping the shaft door 630 at a second position corresponding to a semi-open configuration of the shaft door 630. The semi-open configuration of the shaft door 630 is between the closed configuration and an open configuration of the shaft door 630. Furthermore, the shaft door lock L has a second locked configuration for locking the shaft door 630 at the second position.

Moreover, the shaft door lock L further comprises at least one counter-stopper, e.g., a first counter-stopper C1. Further, the shaft door lock L may include a second counter-stopper C2. The at least one counter-stopper, e.g., the first counter-stopper C1, is configured to engage with the first stopper S1 for stopping the shaft door 630 at the first position. The second counter-stopper C2 may be configured to engage with the second stopper S2 for stopping the shaft door 630 at the second position.

According to some embodiments, which can be combined with other embodiments described herein, the first stopper S1 and the second stopper S2 may be attached to a stationary door frame, e.g., a stationary door frame 620. In some embodiments, the first counter-stopper C1 and the second counter-stopper C2 may be attached to the shaft door 630. In some embodiments, the first counter-stopper C1 and the second counter-stopper C2 may be co-moveable together with the shaft door 630.

According to some embodiments, which can be combined with other embodiments described herein, the emergency release mechanism R may be configured for manually releasing the shaft door lock L from a second locked configuration, thereby allowing the shaft door 630, to move, from the second position, in an opening direction OD for opening the shaft door 630.

According to some embodiments, which can be combined with other embodiments described herein, the emergency release mechanism R may be configured for retracting the first counter-stopper C1 from an extended counter-stopper position to a retracted counter-stopper position thereby releasing the counter-stopper C1 from an engagement with the first stopper S1. In some embodiments, the emergency release mechanism R may be configured for retracting the second counter-stopper C2 from an extended counter-stopper position to a retracted counter-stopper position thereby releasing the counter-stopper C2 from an engagement with the second stopper S2.

In some embodiments, the emergency release mechanism R may be configured for releasing the first counter-stopper C1 from an engagement with the first stopper S1. In some embodiments, the emergency release mechanism R may be configured for releasing the second counter-stopper C2 from an engagement with the second stopper S2. In some embodiments, the emergency release mechanism R may be configured for locking a shaft door 630 at a first position. In some embodiments, the emergency release mechanism R may be configured for locking the shaft door 630 at a second position. In some embodiments, the emergency release mechanism R may be configured for unlocking the shaft door 630 at a first position. In some embodiments, the emergency release mechanism R may be configured for unlocking the shaft door 630 at a second position.

According to some embodiments, which can be combined with other embodiments described herein, the emergency release mechanism R may include a first release element R1 for retracting a first counter-stopper C1 from an extended counter-stopper position to a retracted counter-stopper position thereby releasing the first stopper S1 from an engagement with the counter-stopper C1.

In some embodiments, the emergency release mechanism R may include a second release element R2 for retracting a second counter-stopper C2 from an extended counter-stopper position to a retracted counter-stopper position thereby releasing the second stopper S2 from an engagement with the second counter-stopper C2. In some embodiments, the emergency release mechanism R may include a latch mechanically connected with at least one of a first counter-stopper C1 and a second counter-stopper C2. In some embodiments, the emergency release mechanism R may include a latch mechanically connected with a first counter-stopper C1 and a latch mechanically connected with a second counter-stopper C2. Further, the emergency release mechanism may include an opening adapted to be passed by a key.

Figure 7A:
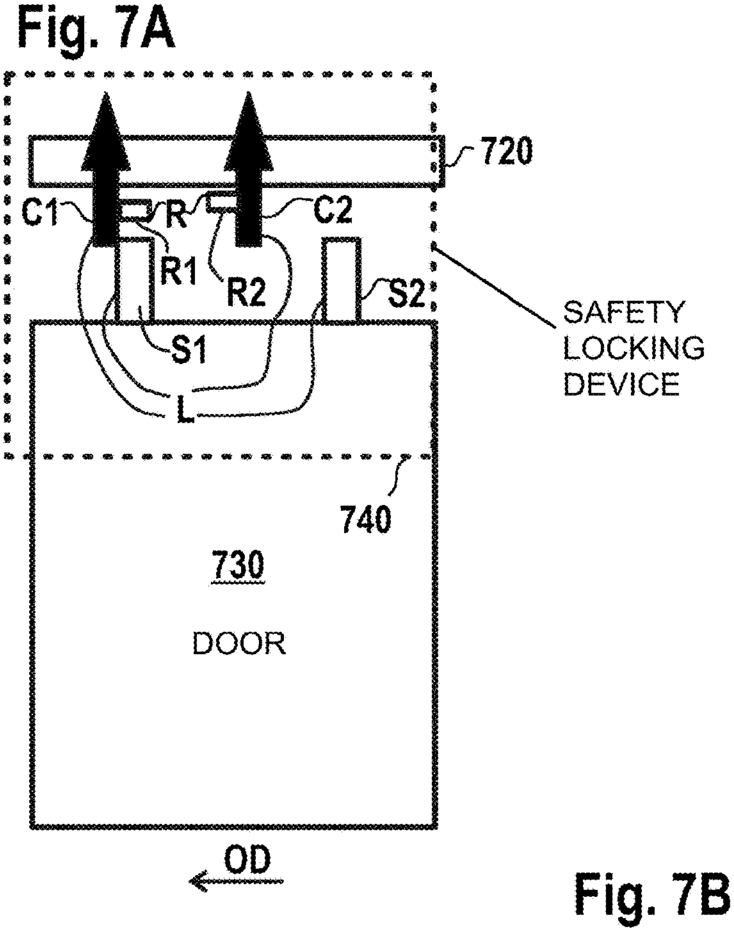
Figure 7B:
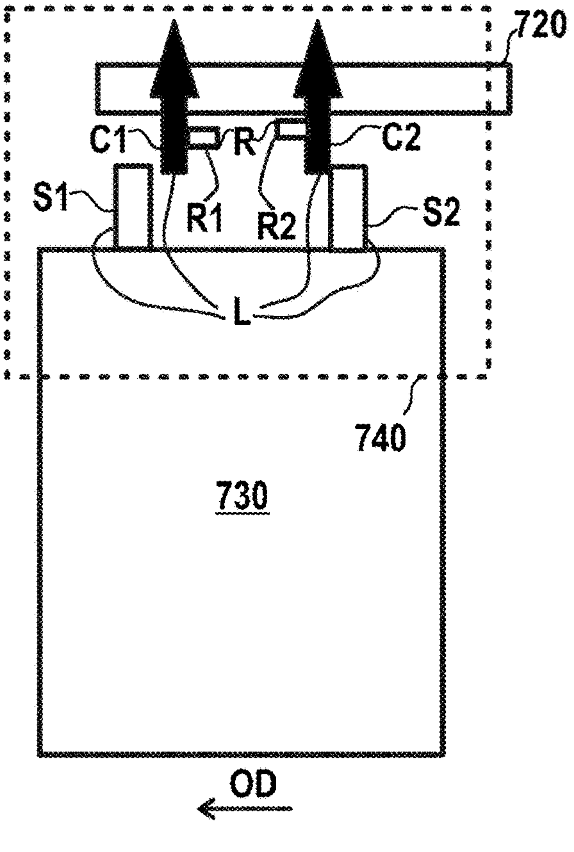

FIGS. 7A und and 7B show schematic views of a safety locking device 740 for a shaft door 730 of an elevator according to further embodiments described herein. In particular, FIG. 7A shows a schematic view of a safety locking device 740 for a shaft door 730 of an elevator at a first position. Further, FIG. 7B shows a schematic view of a safety locking device 740 for a shaft door 730 of an elevator at a second position. The first position of the shaft door 730 corresponds to a closed configuration of the shaft door 730. Furthermore, the second position of a shaft door 730 corresponds to a semi-open configuration of the shaft door 730.

The safety locking device 740 includes a shaft door lock L. Further, the shaft door lock L has a first stopper S1. The first stopper S1 is for stopping the shaft door 730 at a first position corresponding to a closed configuration of the shaft door 730. Furthermore, the shaft door lock L has a first locked configuration. The first locked configuration of the shaft door lock L is for locking the shaft door 730 at the first position. Moreover, the safety locking device 740 includes an emergency release mechanism R. The emergency release mechanism R is for manually releasing the shaft door lock L from the first locked configuration, thereby allowing the shaft door 730 to move, from the first position, in an opening direction OD for opening the shaft door 730.

Further, the shaft door lock L further has a second stopper S2. The second stopper S2 is for stopping the shaft door 730 at a second position corresponding to a semi-open configuration of the shaft door 730. The semi-open configuration of the shaft door 730 is between the closed configuration and an open configuration of the shaft door 730. Furthermore, the shaft door lock L has a second locked configuration for locking the shaft door 730 at the second position.

Moreover, the shaft door lock L further comprises at least one counter-stopper, e.g., a first counter-stopper C1. Further, the shaft door lock L may include a second counter-stopper C2. The at least one counter-stopper, e.g., the first counter-stopper C1, is configured to engage with the first stopper S1 for stopping the shaft door 730 at the first position. The second counter-stopper C2 may be configured to engage with the second stopper S2 for stopping the shaft door 730 at the second position.

According to some embodiments, which can be combined with other embodiments described herein, the first stopper S1 and the second stopper S2 may be attached to the shaft door 630. In some embodiments, the first counter-stopper C1 and the second counter-stopper C2 may be attached to a stationary door frame, e.g., the stationary door frame 720. In some embodiments, the first stopper S1 and the second stopper S2 may be co-moveable together with the shaft door 730.

According to some embodiments, which can be combined with other embodiments described herein, the emergency release mechanism R may be configured for manually releasing the shaft door lock L from a second locked configuration, thereby allowing the shaft door 730, to move, from the second position, in an opening direction OD for opening the shaft door 730.

In some embodiments, the emergency release mechanism R may be configured for releasing the first counter-stopper C1 from an engagement with the first stopper S1. In some embodiments, the emergency release mechanism R may be configured for releasing the second counter-stopper C2 from an engagement with the second stopper S2. In some embodiments, the emergency release mechanism R may be configured for locking a shaft door 730 at a first position. In some embodiments, the emergency release mechanism R may be configured for locking the shaft door 730 at a second position. In some embodiments, the emergency release mechanism R may be configured for unlocking the shaft door 730 at a first position. In some embodiments, the emergency release mechanism R may be configured for unlocking the shaft door 730 at a second position.

The embodiments so far have been described as embodiments having a single-panel shaft door. The invention is also applicable to other shaft door types. For example, the shaft door may have a moveable door element, which is moveable between a first position corresponding to a closed configuration of the shaft door and a second position corresponding to a semi-open configuration of the shaft door (and a third position corresponding to a fully open configuration of the shaft door). The moveable door element may be a shaft door panel, as was for example the case in the embodiment of FIG. 1B. However, the moveable door element may alternatively also be different from a shaft door panel and be coupled to the shaft door panel by a gear mechanism.

In the case of a multi-panel door, the moveable element may be one of the shaft door panels or a separate element. One or more further shaft door panels may be coupled to the moveable element by a suitable gear in known manner, thereby coupling the motion of the one or more further shaft door panels to the moveable element. Thereby, the motion of all door panels is coordinated. In particular, when the moveable element is locked, the door panels are locked as well. Alternatively, the safety locking device as described herein may be coupled to only a subset of the door panels, e.g., only to the door panels at one side of a shaft door or to the central door panels of the shaft door.

FIGS. 8A to 8D show schematic views of an elevator 810 according to further embodiments described herein.

The elevator 810 may include a frame 820 and a shaft door 830 including a first panel **830*a* and a second panel 830*b*. Accordingly, at least one of the first panel 830*a* and the second panel 830*b* of the shaft door 830 may include a safety locking device according to embodiments described in the present disclosure. For example, the first panel 830*a* may include such a safety locking device, and the second panel 830*b*** may be coupled to the first panel in a known manner by a gear, for being moved in a mirror-like manner with the first panel.

Figure 8A:
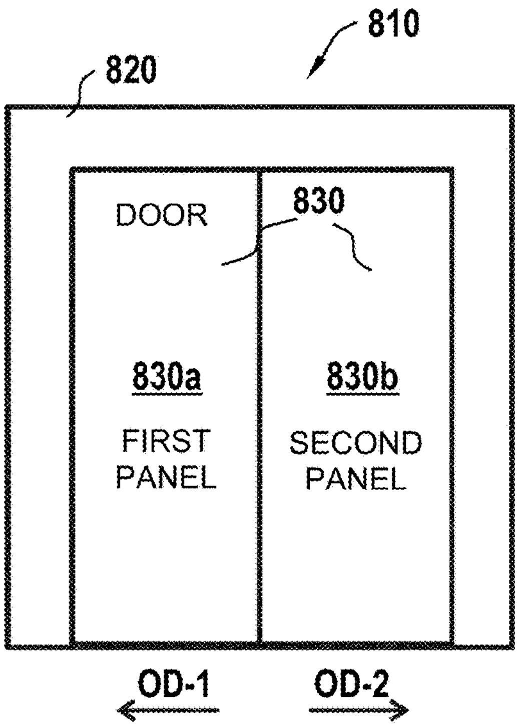
FIGS. 8A to 8D show schematic views of an elevator shaft door according to further embodiments described herein.
Figure 8B:
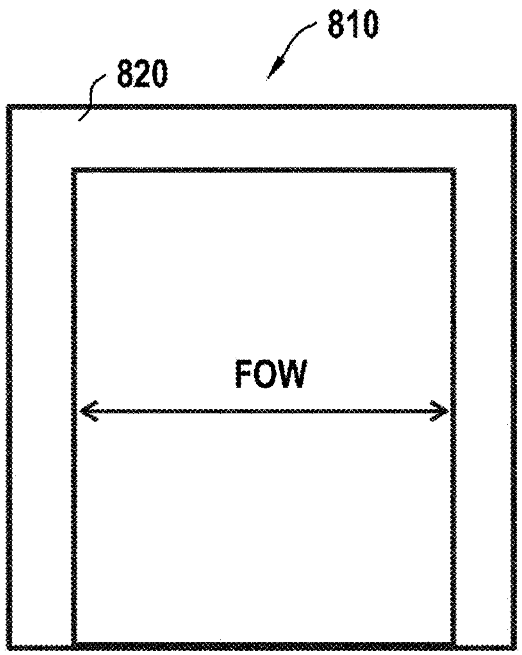

Referring to FIG. 8A, the shaft door 830 may be in a first position corresponding to a closed configuration of the shaft door 830. Referring to FIG. 8B, the shaft door 830 may be in a fully open configuration having a full-opening width FOW.

Figure 8C:
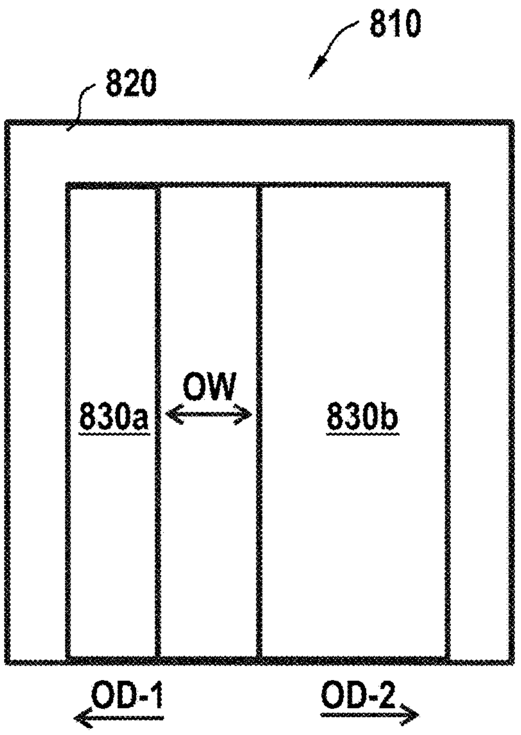
Figure 8D:
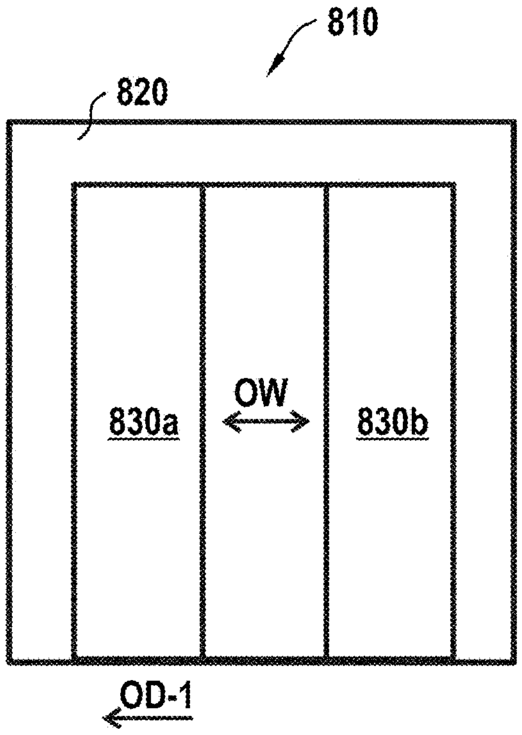

Referring to FIGS. 8C and 8D, the shaft door 830 may be in a second position corresponding to a semi-open configuration of the shaft door 830. The semi-opening configuration of the shaft door may be a one-side semi-opening configuration or a two-side semi-opening configuration. In the embodiment of FIG. 8C, only the first (left-side) door panel **830*a* is coupled to a safety locking device as described herein, whereas the second (right-side) door panel 830*b* remains locked in the closed configuration. Thus, by moving the first panel 830*a* in an opening direction OD-1, from the first position to the second position, the shaft door 830** can have a semi-opening width OW.

In the embodiment of FIG. 8D, the motion of the first (left-side) door panel **830*a* is coupled to the second (right-side) door panel 830*b* by a gear, and one or both door panels are in addition coupled to the safety locking device as described herein. Thus, the first and second panels 830*a***,

830*b* are moved jointly in their respective opening directions OD-1, OD-2, from the first position to the second position, whereby the shaft door 830 can have a semi-opening width OW.

Figure 9:
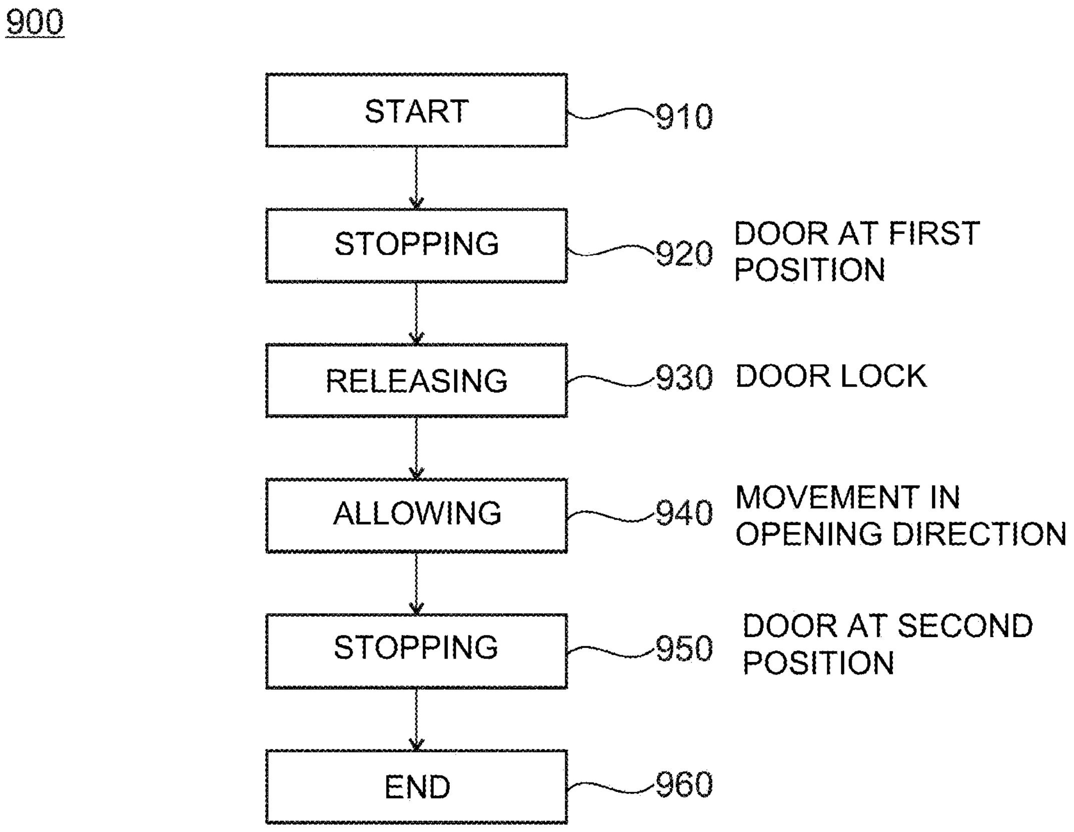
FIG. 9 shows a flow chart of a method for opening a shaft door of an elevator using a safety locking device according to embodiments described herein.

FIG. 9 shows a flow chart of a method 900 for opening a shaft door of an elevator using a safety locking device according to embodiments described herein. The method 900 can be implemented using the safety locking device according to the present disclosure.

The method 900, beginning at start 910, includes stopping 920 the shaft door at a first position corresponding to a closed configuration of the shaft door with a shaft door lock L having a first stopper S1 and at least one counter-stopper C1, C2 configured to engage with the first stopper S1. Further, the method 900 includes manually releasing 930 the shaft door lock L in the closed configuration of the shaft door using an emergency release mechanism R. Furthermore, the method 900 includes allowing 940 the shaft door to move, from the first position, in an opening direction for opening the shaft door. Moreover, the method 900 includes stopping 950 the shaft door at a second position corresponding to a semi-open configuration of the shaft door with the shaft door lock L having further a second stopper S2 and the at least one counter-stopper C1, C2 further configured to engage with the second stopper S2. Method 900 concludes at end 960.

According to some embodiments, which can be combined with other embodiments described herein, stopping 920 the shaft door at a first position may include engaging the first stopper S1 and at least one counter-stopper C1, C2, e.g., the first counter-stopper C1. Further, stopping 920 the shaft door at a first position may include locking the shaft door at a first position. Furthermore, stopping 920 the shaft door at a first position may include extending the first stopper S1 from a retracted stopper position to an extended stopper position. Moreover, stopping 920 the shaft door at a first position may include extending at least one counter-stopper, e.g., the counter-stopper C1, from a retracted counter-stopper position to an extended counter-stopper position.

According to some embodiments, which can be combined with other embodiments described herein, manually releasing 930 the shaft door lock L may include unlocking the shaft door at a first position. Further, manually releasing 930 the shaft door lock L may include disengaging the first stopper S1 and at least one counter-stopper C1, C2, e.g., the first counter-stopper C1. Furthermore, manually releasing 930 the shaft door lock L may include retracting the first stopper S1 from an extended stopper position to a retracted stopper position. Moreover, manually releasing 930 the shaft door lock L may include retracting at least one counter-stopper, e.g., the counter-stopper C1, from an extended counter-stopper position to a retracted counter-stopper position. Further, manually releasing 930 the shaft door lock L may include passing a key through an opening of the emergency release mechanism.

In some embodiments, stopping 950 the shaft door at a second position may include engaging the second stopper S2 and at least one counter-stopper C1, C2, e.g., the second counter-stopper C2. In some embodiments, stopping 950 the shaft door at a second position may include engaging the second stopper S2 and at least one counter-stopper C1, C2, e.g., the first counter-stopper C1. Further, stopping 950 the shaft door at a second position may include locking the shaft door at the second position. Furthermore, stopping 950 the shaft door at a second position may include extending the second stopper S2 from a retracted stopper position to an extended stopper position. Moreover, stopping 920 the shaft door at a first position may include extending at least one counter-stopper, e.g., the counter-stopper C1 or the counter-stopper C2, from a retracted counter-stopper position to an extended counter-stopper position.

While the foregoing is directed to embodiments of the disclosure, other and further embodiments of the disclosure may be devised without departing from the basic scope thereof, and the scope thereof is determined by the claims that follow.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A safety locking device for locking a shaft door of an elevator, the safety locking device comprising:

a shaft door lock having a first stopper adapted to stop the shaft door at a first position corresponding to a closed configuration of the shaft door, the shaft door lock having a first locked configuration locking the shaft door at the first position;

an emergency release mechanism adapted to manually release the shaft door lock from the first locked configuration thereby allowing the shaft door to move from the first position in an opening direction to open the shaft door;

the shaft door lock having a second stopper adapted to stop the shaft door at a second position corresponding to a semi-open configuration of the shaft door, the semi-open configuration being positioned between the closed configuration and an open configuration of the shaft door, the shaft door lock having a second locked configuration locking the shaft door at the second position; and the shaft door lock having at least one counter-stopper adapted to engage with the first stopper to stop the shaft door at the first position and to engage with the second stopper to stop the shaft door at the second position;

where the first and second stoppers are both attached to the shaft door or the first and second stoppers are both attached to a stationary door frame at the shaft door.

2. The safety locking device according to claim 1 wherein the emergency release mechanism is adapted to manually release the shaft door lock from the second locked configuration thereby allowing the shaft door to move from the second position in the opening direction to open the shaft door to the open configuration.

3. The safety locking device according to claim 1 wherein the at least one counter-stopper is a single counter-stopper adapted to engage with both the first stopper and the second stopper.

4. The safety locking device according to claim 1 wherein the at least one counter-stopper includes a first counter-stopper adapted to engage with the first stopper to stop the shaft door at the first position and a second counter-stopper adapted to engage with the second stopper to stop the shaft door at the second position.

5. The safety locking device according to claim 1 wherein the first stopper and the second stopper are attached to the shaft door and the at least one counter-stopper is attached to the stationary door frame at the shaft door.

6. The safety locking device according to claim 1 wherein the first stopper and the second stopper are attached to the stationary door frame at the shaft door and the at least one counter-stopper is attached to the shaft door.

7. The safety locking device according to claim 1 wherein the emergency release mechanism is adapted to retract the at least one counter-stopper from an extended counter-stopper position to a retracted counter-stopper position thereby releasing the at least one counter-stopper from the engagement with the first stopper or with the second stopper.

8. The safety locking device according to claim 1 wherein the emergency release mechanism includes a first release element that retracts the first stopper from an extended stopper position to a retracted stopper position thereby releasing the first stopper from the engagement with the at least one counter-stopper.

9. The safety locking device according to claim 8 wherein the emergency release mechanism includes a second release element that retracts the second stopper from an extended stopper position to a retracted stopper position thereby releasing the second stopper from the engagement with the at least one counter-stopper.

10. The safety locking device according to claim 1 wherein when the shaft door is in the semi-open configuration, a semi-open opening width of the shaft door is at most half of a full-opening width of the shaft door in a fully open configuration.

11. The safety locking device according to claim 1 wherein a semi-open opening width of the shaft door is in a range of 10 cm to 40 cm.

12. The safety locking device according to claim 1 wherein the semi-open configuration of the shaft door is a one-side semi-open configuration or a two-side semi-open configuration.

13. The safety locking device according to claim 1 wherein the emergency release mechanism is mechanically connected with at least one of the first stopper, the second stopper, and the at least one counter-stopper.

14. A method for opening a shaft door of an elevator using the safety locking device according to claim 1, the method comprising the steps of:

stopping the shaft door at a first position corresponding to a closed configuration of the shaft door by engaging the first stopper of the shaft door lock with the at least one counter-stopper;

manually releasing the shaft door lock in the closed configuration of the shaft door using the emergency release mechanism;

allowing the shaft door to move from the first position in an opening direction for opening the shaft door; and stopping the shaft door at a second position corresponding to a semi-open configuration of the shaft door by engaging the second stopper of the shaft door lock with and the at least one counter-stopper.

* * * * *